United States Patent

Son et al.

[11] Patent Number: 5,943,181
[45] Date of Patent: Aug. 24, 1999

[54] MAGNETIC TAPE LOADING DEVICE UTILIZING INNER GEAR PORTION COUPLING

[75] Inventors: Byung-sam Son; Yong-chae Jeong; Myung-seob Jang, all of Suwon; Chung-ung Kim, Seoul, all of Rep. of Korea

[73] Assignee: Samsung Electronics Co., Ltd., Rep. of Korea

[21] Appl. No.: 08/926,051

[22] Filed: Sep. 9, 1997

[30]   Foreign Application Priority Data

Sep. 10, 1996 [KR]   Rep. of Korea ..................... 96-39149

[51] Int. Cl.⁶ .......................... G11B 15/665; G11B 15/61
[52] U.S. Cl. ................. 360/95; 242/332; 360/85
[58] Field of Search .............. 360/85, 95, 96.5; 242/332, 338.4

[56]   References Cited

U.S. PATENT DOCUMENTS

| | | | |
|---|---|---|---|
| 4,595,961 | 6/1986 | Kuwajima | 360/85 |
| 4,704,643 | 11/1987 | Matsuoka et al. | 360/95 |
| 4,912,578 | 3/1990 | Katohno et al. | 360/85 |
| 4,951,164 | 8/1990 | Yasaka et al. | 360/95 |
| 4,975,793 | 12/1990 | Oka | 360/85 |
| 5,103,356 | 4/1992 | Fujiwara et al. | 360/85 |
| 5,151,832 | 9/1992 | Nagasawa | 360/95 |
| 5,200,865 | 4/1993 | Yoon | 360/85 |
| 5,459,626 | 10/1995 | Lee et al. | 360/85 |
| 5,636,079 | 6/1997 | Choi | 360/85 |

*Primary Examiner*—Craig A. Renner
*Attorney, Agent, or Firm*—Dilworth & Barrese

[57]   ABSTRACT

A magnetic tape loading device for a tape recorder includes a loading motor installed in a main base of a deck. A worm wheel is installed in the main base to be coupled with a worm fixed to an output shaft of the loading motor. A cam gear member, a coupled to the worm wheel, and has at least one cam hole. A first lever is installed in the main base to be pivotable while a first end of the first lever is coupled to the cam hole. A main slide member is installed in the main base to be capable of linearly reciprocating by the pivotal movement of the first lever. A pair of pole base assemblies is installed in the main base to be movable and is interlocked with the main slide member.

5 Claims, 5 Drawing Sheets

MAGNETIC TAPE LOADING DEVICE UTILIZING INNER GEAR PORTION COUPLING

BACKGROUND OF THE INVENTION

1. Field of the Invention

The present invention relates to a deck mechanism of a tape recorder, and more particularly, to a magnetic tape loading device for drawing out magnetic tape from a tape cassette to load the drawn magnetic tape onto a traveling position.

2. Description of the Related Art

Referring to FIG. 1, a conventional video tape recorder (VTR) includes a tape cassette loading device for loading and unloading a tape cassette (not shown) by a driving force of a loading motor 10 installed on a main base 100, and a magnetic tape loading device for drawing out magnetic tape from the loaded tape cassette and placing the same to contact a head drum 11. The loaded magnetic tape travels by the control of a microcomputer chip mounted on a main printed circuit board (PCB) (not shown) installed on the main base 100, according to a selected mode including the basic modes such as record/play (REC/PLAY) or fast-forward/rewind (FF/REW), and a high-speed search mode.

As shown in FIG. 2, the tape cassette loading device includes a gear train having a worm gear 10b and a master gear 10c which are sequentially coupled to a worm 10a connected to a rotary shaft of the loading motor 10, a slide rack 10d capable of linearly reciprocating on the main base 100 (see FIG. 1) while being connected with the gear train, and a cassette holder (not shown). The cassette holder may be raised/lowered by being connected to a rotary member H having a sector gear which is engaged with slide rack 10d installed to be partially rotatable according to the linear reciprocation of the slide rack 10d.

Also, the magnetic tape loading device includes a main slide member 20 having a first rack 20a coupled to the gear train, which is installed in the lower surface of the main base 100 to be capable of linearly reciprocating in a transverse direction with respect to the moving direction of the slide rack 10d, and a pair of pole base assemblies 13 and 13' for drawing out the magnetic tape from the tape cassette to the outer circumferential surface of a head drum 11 according to the linear reciprocation of the main slide member 20. The pole base assemblies 13 and 13' are connected to loading gears 31 and 31' shown in FIGS. 3 and 4, and transferred along guide slots 101 and 101' formed on the main base 100. A pinion 31a coaxially connected to the loading gear 31 is engaged with a second rack 20b formed in the main slide member 20, so that the loading gears 31 and 31' rotate according to the linear reciprocation of the main slide member 20. Reference numerals 32 and 32' of FIG. 3 represent arm members connected to loading gears 31 and 31', the ends of which link members 33 and 33' for supporting the pole base assemblies 13 and 13' are connected. Also, reference numerals 12 and 12' represent reel tables which rotate while inserted into reels (not shown) of the loaded cassette tape to cause movement of the magnetic tape. Reference numeral 14 represents an output shaft of a capstan motor (not shown) for driving the reel tables 12 and 12'. Reference numeral 15 represents a pinch roller for closely pushing the magnetic tape against the output shaft 14 of the capstan motor, and reference numeral 16 represents a review arm which interlocks with the main slide member 20 to provide a predetermined tension to the magnetic tape.

In the tape cassette loading device and the magnetic tape loading device of the conventional video tape recorder, having the above structure, the structure for transferring the power of the loading motor and the driving relationship thereof are complicated, so that productivity in assembling the device is low, thereby increasing the manufacturing costs.

SUMMARY OF THE INVENTION

It is an object of the present invention to provide a magnetic tape loading device of a tape recorder having a simplified structure to improve productivity in assembling and reduce the manufacturing costs.

To achieve the object, there is provided a magnetic tape loading device for a tape recorder comprising: a loading motor installed in a main base of a deck; a worm wheel installed in the main base to be coupled with a worm fixed to an output shaft of the loading motor; a cam gear member coupled to the worm wheel, having at least one cam hole; a first lever installed in the main base to be pivotable while one end of the first lever is coupled to the cam hole; a main slide member installed in the main base to be capable of linearly reciprocating by the pivotal movement of the first lever; and a pair of pole base assemblies installed in the main base to be movable and being interlocked with the main slide member.

Here, preferably, the cam gear member has a first cam hole coupled to the one end of the first lever, and a second cam hole, and the magnetic tape loading device further comprises: a second lever installed in the main base to be pivotable while one end of the second lever is coupled to the second cam hole; and a pinch roller installed at the other end of the second lever for selectively pushing a magnetic tape against a capstan motor shaft to guide the magnetic tape.

Also, preferably, the cam gear member is a sun gear installed in the main base, having an inner gear portion coupled to a planetary gear coaxially connected to the worm wheel. Preferably, the main slide member has a pair of cam slots, and the magnetic tape loading device further comprises: a pair of arm members installed to be pivotable in the main base, each having a cam pin coupled to the cam slot; and a pair of link members for respectively connecting the arm members to the pole base assemblies.

It is preferable that the respective cam slots include a slant portion which is at a slant with respect to the moving direction of the main slide member, and a pair of straight portions extending from both ends of the slant portion, parallel to the moving direction of the main slide member.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENTS

Figure 1:
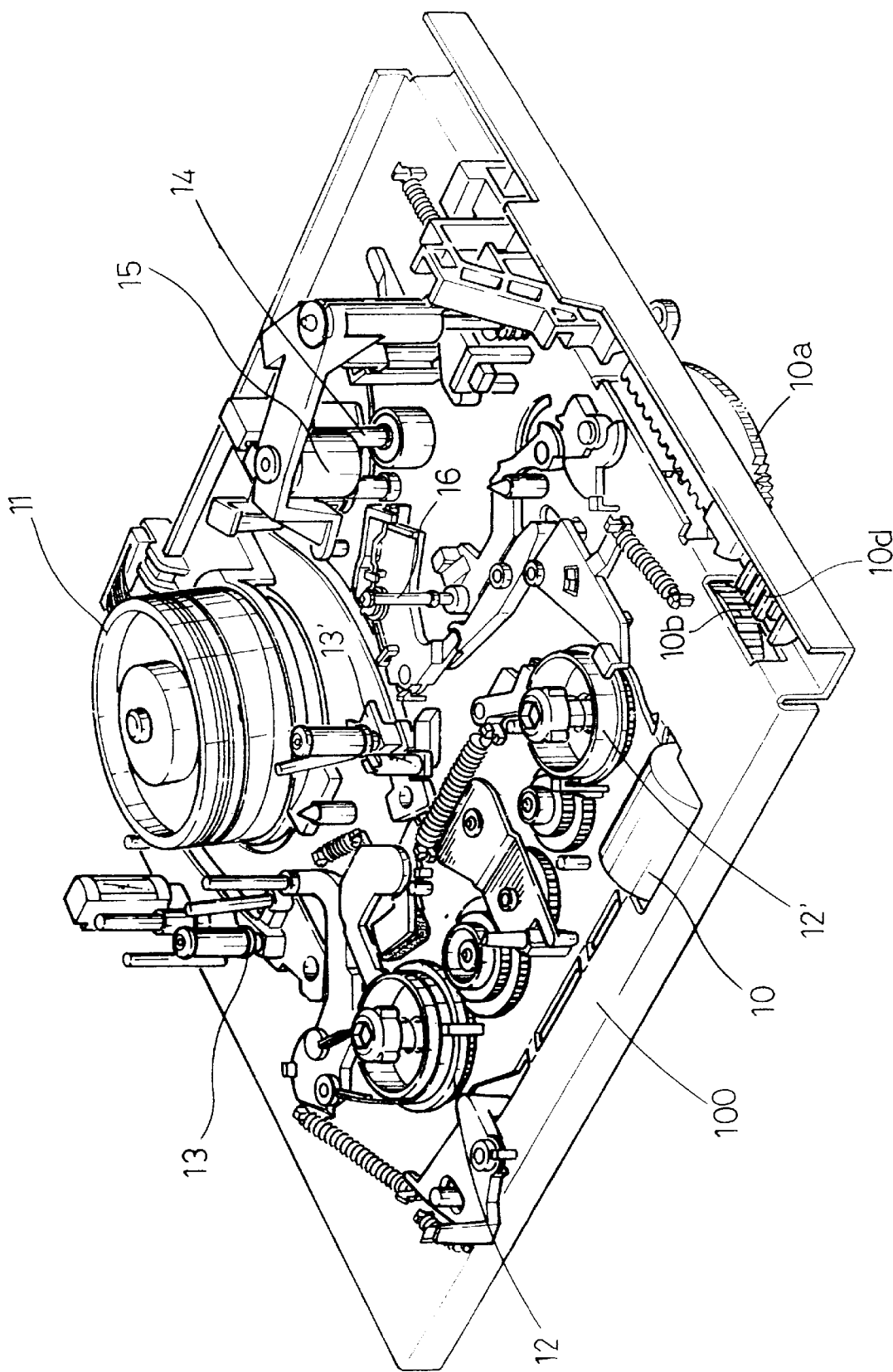
FIG. 1 is a perspective view schematically showing a deck mechanism of a conventional tape recorder.
Figure 2:
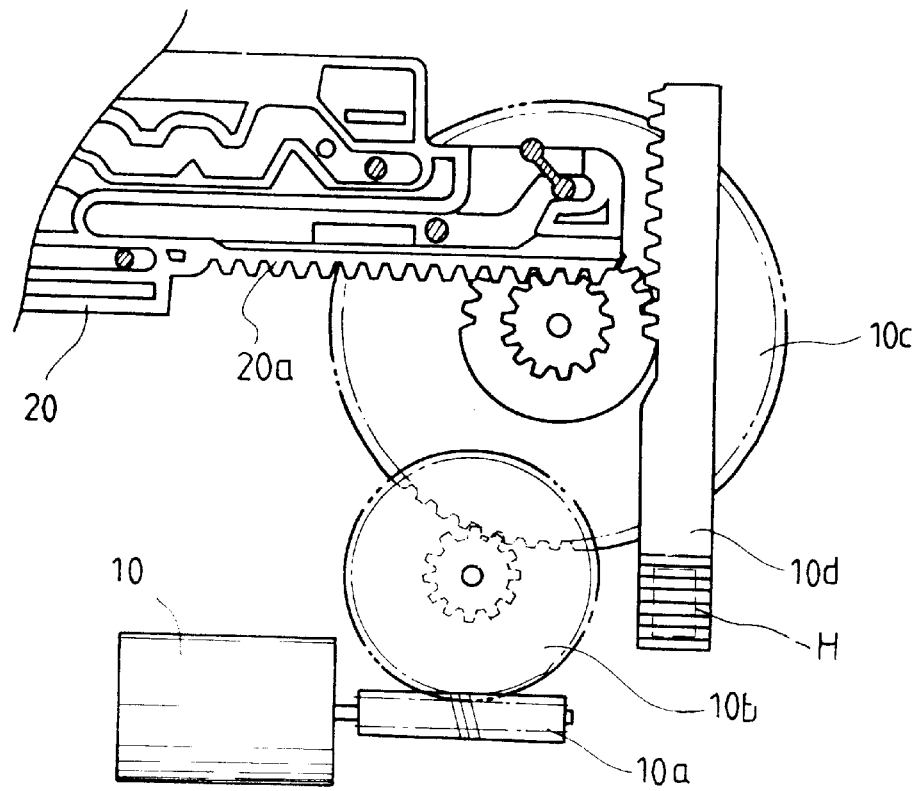
FIG. 2 is a plan view showing major portions of the tape cassette loading device and the magnetic tape loading device of FIG. 1.
Figure 3:
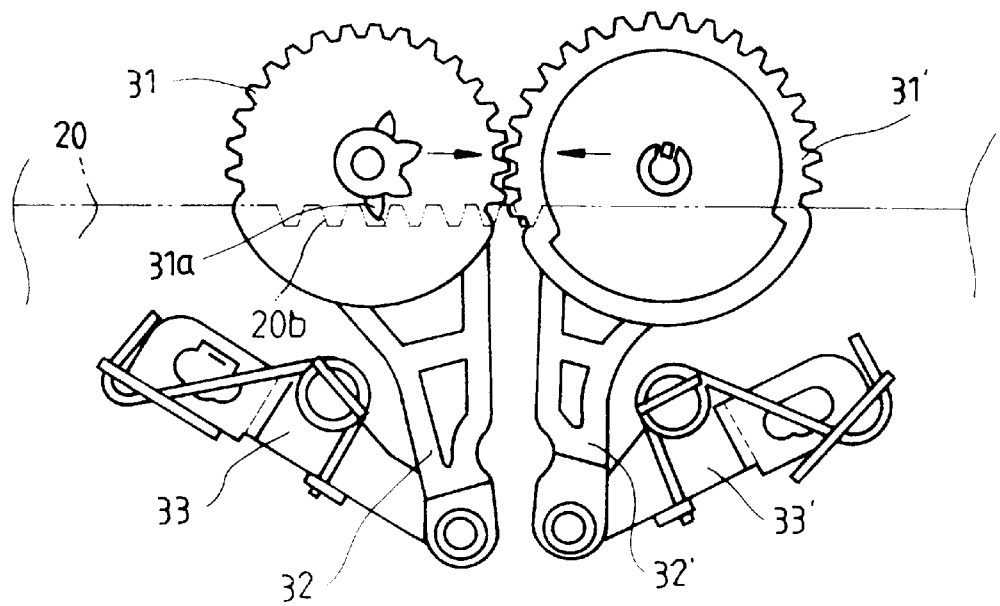
FIG. 3 is a plan view showing the loading gear for driving the pole base assemblies of FIG. 1.
Figure 4:
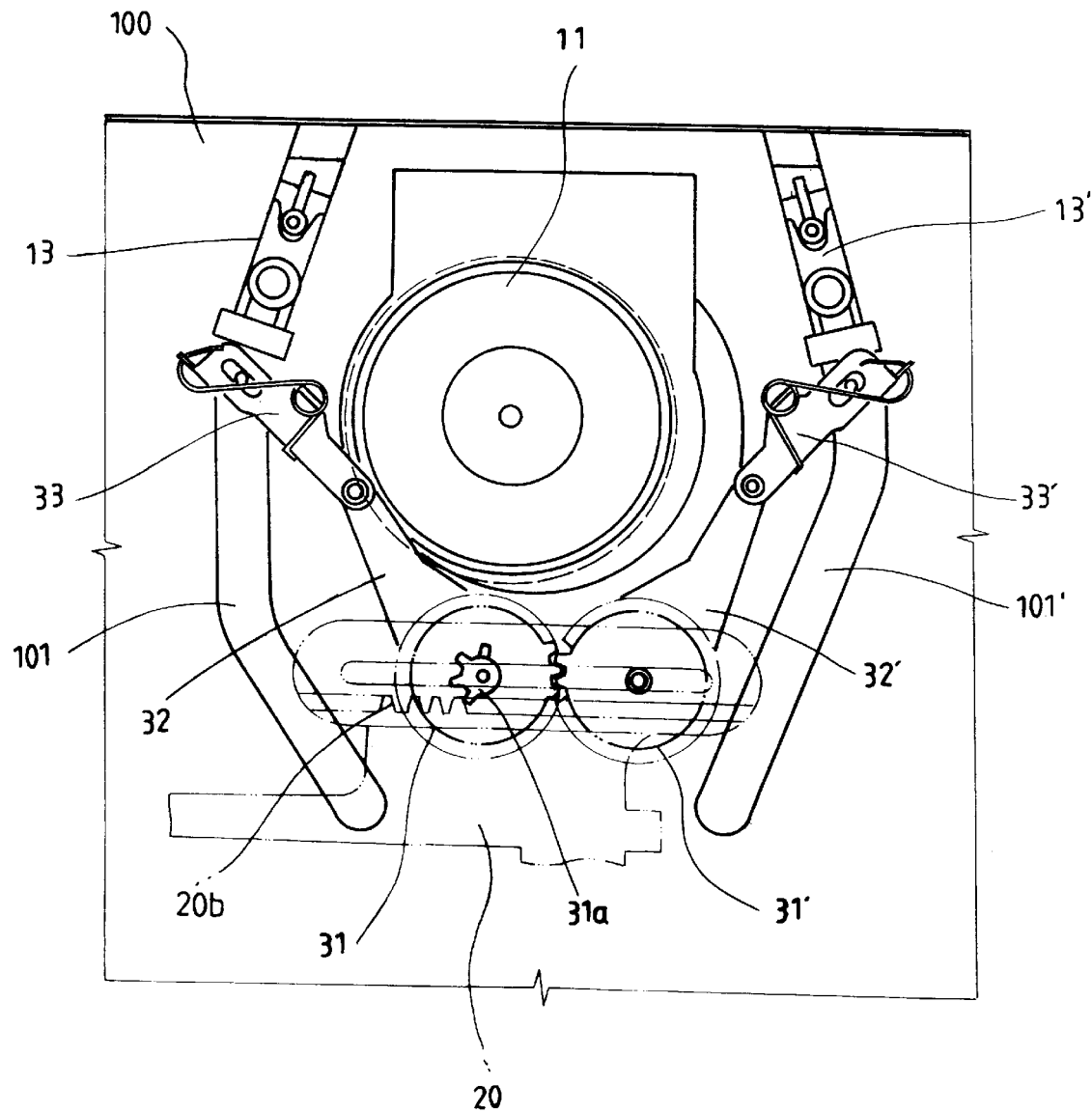
FIG. 4 is a bottom view of the deck mechanism of the tape recorder of FIG. 1.
Figure 5:
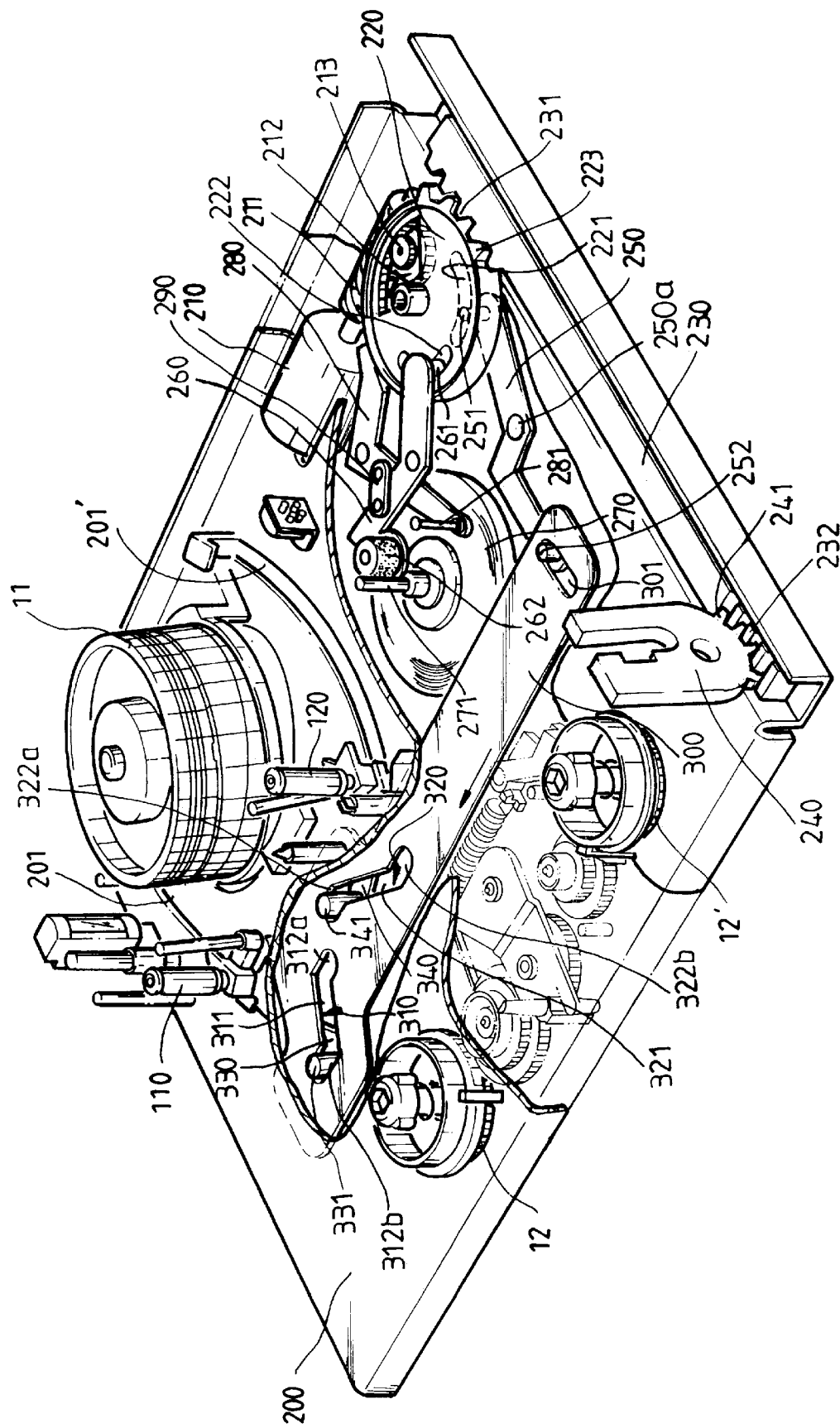
FIG. 5 is a perspective view schematically showing a deck mechanism of a tape recorder adopting a magnetic tape loading device according to the present invention.

Referring to FIG. 5, a magnetic tape loading device of a tape recorder according to the present invention includes a loading motor 210 which is installed on a main base 200, having a worm 211 at an output shaft thereof, a worm wheel 212 rotatably installed on the main base 200 to be engaged with the worm 211, a planetary gear 213 coaxially installed with the worm wheel 212, a cam gear member such as a sun gear 220, in which a first cam hole 221, a second cam hole 222 are formed having an outer gear portion 223 formed along the outer circumference thereof and an inner gear portion formed along the inner circumference thereof to be engaged with the planetary gear 213, a first lever 250 rotatably installed on the main base 200, having a cam pin 251 coupled to the first cam hole 221 at one end thereof, a main slide member 300 installed adjacent the lower surface of the main base 200 to be capable of linearly reciprocating according to the pivotal movement of the first lever 250, having a slot 301 which receives a pin 252 formed at the other end of the first lever 250, and a pair of pole base assemblies 110 and 120 installed to be transferred along guide slots 201 and 201', respectively, formed on the main base 200, being interlocked with the main slide member 300.

According to the present invention, the second cam hole 222 of the sun gear 220 receives the cam pin 261 formed at one end of the second lever 260 rotatably installed on the main base 200. Also, a pinch roller 262 is installed at the other end of the second lever 260 such that a rotation thereof pushes the magnetic tape against a rotary shaft 271 of a capstan motor 270 to guide the same by the pivot movement of the second lever 260.

The outer gear portion 223 formed along the outer circumference of the sun gear 220 is coupled to a first rack 231 formed along the slide rack member 230, and the slide rack member 230 moves slidingly in a loading/unloading direction of a tape cassette (not shown), that is, in the forward/backward direction of a deck. A second rack 232 of the slide rack member 230 is engaged with a sector gear 241 of a rotary member 240 for raising/lowering a cassette holder (not shown) to rotate the rotary member 240. Also, a pair of cam slots 310 and 320 are formed in the main slide member 300, which includes slant portions 311 and 321 which are at a slant with respect to the moving direction of the main slide member 300, and a pair of straight portions 312a and 312b, and 322a and 322b which extend from both ends of the slant portions 311 and 322, respectively, substantially parallel to the moving direction of the main slide member 300.

Figure 6:
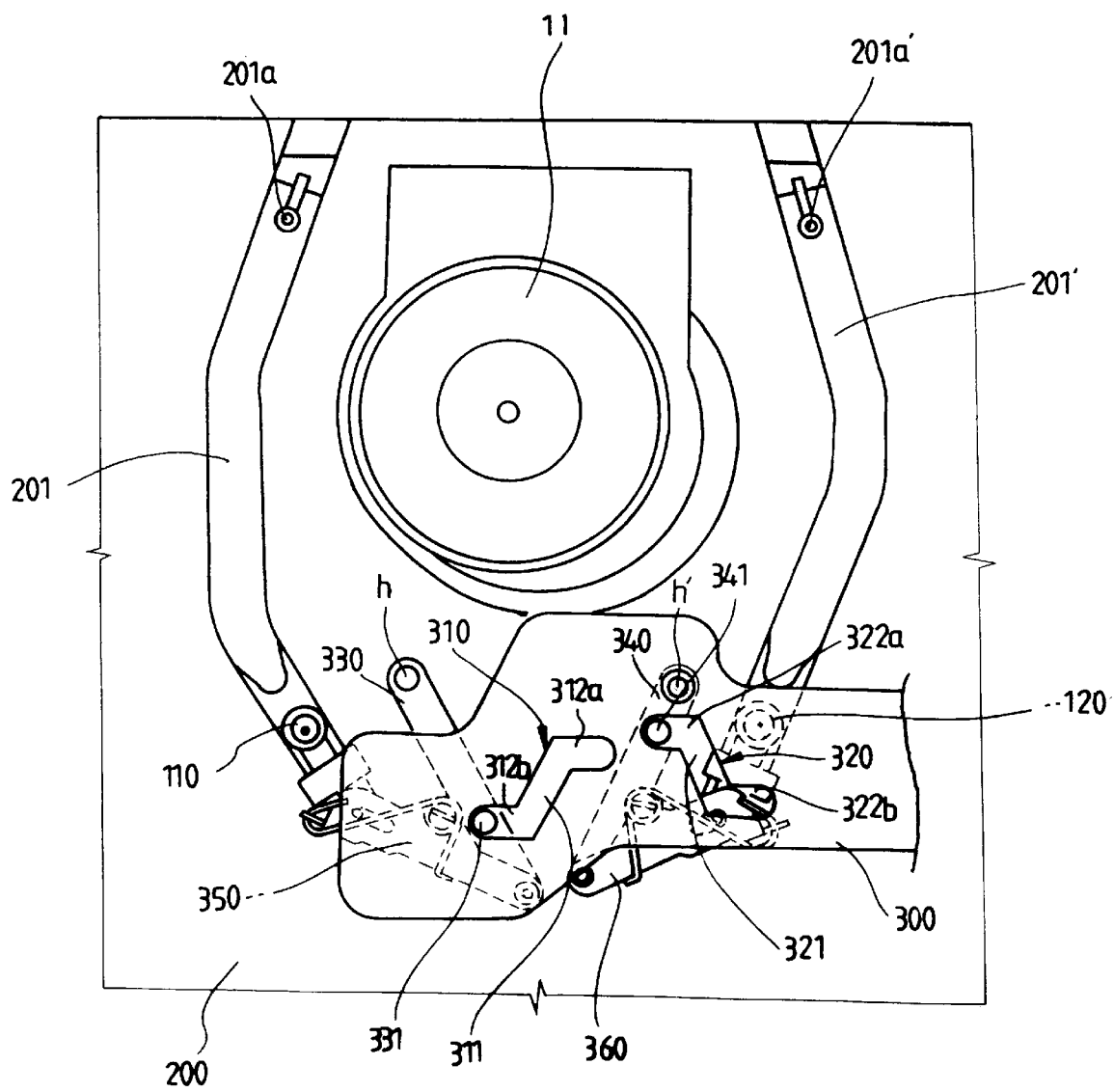
FIG. 6 is a bottom view of the deck mechanism of the tape recorder of FIG. 5.

As shown in FIG. 6, cam pins 331 and 341 mounted on a pair of arm members 330 and 340 are moveably coupled to the cam slots 310 and 320, respectively. The fixed ends of the arm members 330 and 340 are pivotably coupled to the main base 200 by hinge pins h and h', and the free ends thereof are connected to the pole base assemblies 110 and 120 by link members 350 and 360, respectively.

Although not shown, the worm wheel 212 may be coupled to the gear train including at least one gear member, instead of the planetary gear 213, and the gear train may be coupled to the cam gear member having the cam holes, instead of the sun gear 220.

In FIGS. 5 and 6, the same reference numerals as those of the previously described drawings represent the same elements.

In the magnetic tape loading device according to the present invention, having the above structure, when a tape cassette is received into a cassette holder (not shown), a mode switch (not shown) is simultaneously operated to drive the loading motor 210. The driving force of the loading motor 210 is transferred to the sun gear 220 via the worm 211, worm wheel 212 and planetary gear 213, thereby rotating the sun gear 220. As a result, the slide member 230 slides in the forward direction of the deck by the interaction of first rack 231 being meshed with the outer gear portion 223 of the sun gear 220. At this time, the rotary member 240 rotates by the interaction of sector gear 241 being meshed with the second rack 232 of the slide rack member 230 to lower the cassette holder (not shown) supported by the rotary member 240, thereby placing the tape cassette in a loading position.

When the tape cassette is loaded, the first lever 250 whose cam pin 251 is coupled to the first cam hole 221 of the sun gear 220 pivots around a hinge pin 250a. Here, the main slide member 300 slides to the left side of the deck, i.e., in a direction indicated by the arrow, by the pin 252 of the first lever 250, which is coupled to the slot 301 of the main slide member 300.

Here, a sliding stroke of the slide rack member 230 is determined by a section where the first rack 231 is formed, and a rotating angle of the rotary member 240 is determined by sections where the second rack 232 and the sector gear 241 are formed. Thus, the rising/lowering position of the cassette holder is determined according to such sections.

Also, the first cam hole 221 restricts the cam pin 251 to determine the rotating angle of the first lever 250 and the sliding stroke of the main slide member 300 according to the rotating angle.

The slide rack member 230 and the main slide member 300 slide sequentially as the sun gear 220 rotates. Thus, the cam pin 251 starts to move after the sliding of the slide rack member 230 is completed, and the main slide member 300 starts to slide also. As the main slide member 300 slides, the arm members 330 and 340 pivot by the cam pins 331 and 341 inserted into the cam slots 310 and 320, so that the pole base assemblies 110 and 120 move along the guide slots 201 and 201' formed in the main base 100 by the knuckle joint movement of the link members 350 and 360 (see FIG. 6) connected to the arm members 330 and 340. Here, the pole base assemblies 110 and 120 draw out the magnetic tape from the loaded tape cassette and transfer the drawn magnetic tape toward the head drum 11.

When the pole base assemblies 110 and 120 move toward the head drum 11, the second lever 260 pivots by the cam pin 261 inserted into the second cam hole 222 of the sun gear 220, so that the pinch roller 262 installed at the other end of the second lever 260 contacts the drawn magnetic tape, thereby pushing the magnetic tape against the rotary shaft 271 of the capstan motor 270.

Reference numeral 280 of FIG. 5 represents a review arm for applying a predetermined tension to the loaded magnetic tape. For example, the review arm 280 is connected to the second lever 260 by a connect member 290 such that the review arm 280 is interlocked with respect to the pivotal movement of the second lever 260. Accordingly, a guide pole 281 formed at one end of the review arm 180 contacts the magnetic tape, thereby applying a predetermined tension to the magnetic tape. Also, alternatively, the review arm 280 may be installed to be interlocked with the main slide member 300 or the first lever 250 to allow the guide pole 281 to apply a predetermined tension to the loaded magnetic tape.

The structural characteristics and effects of the magnetic tape loading device for a tape recorder according to the present invention, which has been described above, will be summarized as follows.

First, the main slide member is driven by a lever pivoting by the sun gear having the cam holes and the planetary gear connected to a loading motor installed at a main base. As a result, the number of parts can be reduced and the structure can be simplified, compared to the conventional main slide member which is connected to the loading motor by a gear train. Also, it is not necessary to form a rack gear coupled to the gear train in the main slide member, resulting in an improvement in productivity and reduction in the manufacturing costs.

Second, in order to transfer pole base assemblies for drawing out the magnetic tape from the loaded tape cassette, the pole base assemblies are directly driven by the main slide member and arm members connected to the main slide member. Therefore, a loading gear can be eliminated from a conventional pole base assembly transferring means, so that the structure of the magnetic tape loading device can be simplified. Also, it is not necessary to form a rack gear coupled to the loading gear in the main slide member, so that productivity is improved and the manufacturing costs are lowered.

Third, since a lever which pivots to guide a magnetic tape is driven directly by the driving of the sun and planetary gears, the number of connection members can be markedly reduced compared to the conventional case.

Therefore, in the magnetic tape loading device for a tape recorder according to the present invention, the productivity can be improved together with manufacturing costs reduced by simplifying the structure and reducing the number of parts.

What is claimed is:

1. A magnetic tape loading device for a tape recorder comprising:

a loading motor installed in a main base of a deck;

a worm wheel installed in the main base to be coupled with a worm fixed to an output shaft of the loading motor;

a cam gear member coupled to the worm wheel, having at least one cam hole;

a first lever installed in the main base to be pivotable while a first end of the first lever is coupled to the cam hole;

a main slide member installed in the main base to be capable of linearly reciprocating by the pivotal movement of the first lever; and a pair of pole base assemblies installed in the main base to be movable and being interlocked with the main slide member;

wherein the cam gear member is a sun gear installed in the main base; having an inner gear portion coupled to a planetary gear coaxially connected to the worm wheel.

2. The magnetic tape loading device of claim 3, wherein the at least one cam hole includes a first cam hole and a second cam hole, the first cam hole being coupled to the first end of the first lever, and wherein the magnetic tape loading device further comprises:

a second lever installed in the main base to be pivotable while a first end of the second lever is coupled to the second cam hole; and a pinch roller installed at a second end of the second lever, for selectively pushing a magnetic tape against a capstan motor shaft to guide the magnetic tape.

3. The magnetic tape loading device of claim 1, wherein the main slide member has a pair of cam slots, and wherein the magnetic tape loading device further comprises:

a pair of arm members installed to be pivotable in the main base, each having a cam pin coupled to a respective one of the pair of cam slots; and a pair of link members for respectively connecting the arm members to the pole base assemblies.

4. The magnetic tape loading device of claim 3, wherein the respective cam slots include a slant portion which is at a slant with respect to the moving direction of the main slide member, and a straight portion extending from each end of the slant portion, each of the straight portions configured to be substantially parallel to the moving direction of the main slide member.

5. A method of loading a magnetic tape in a tape recorder comprising the steps of:

energizing a loading motor to rotate a planetary gear which is coaxially connected to a worm wheel operatively connected to the loading motor;

pivoting a lever via a sun gear having an inner gear portion which meshes with the planetary gear to drive a main slide member; and drawing magnetic tape out of a loaded tape cassette by driving pole base assemblies with the main slide member.

* * * * *